July 30, 1968 J. W. HEBB 3,395,326
METHOD FOR IMPROVING THE VELOCITY ACCURACY
OF A SERVO CONTROL SYSTEM
Filed July 21, 1965
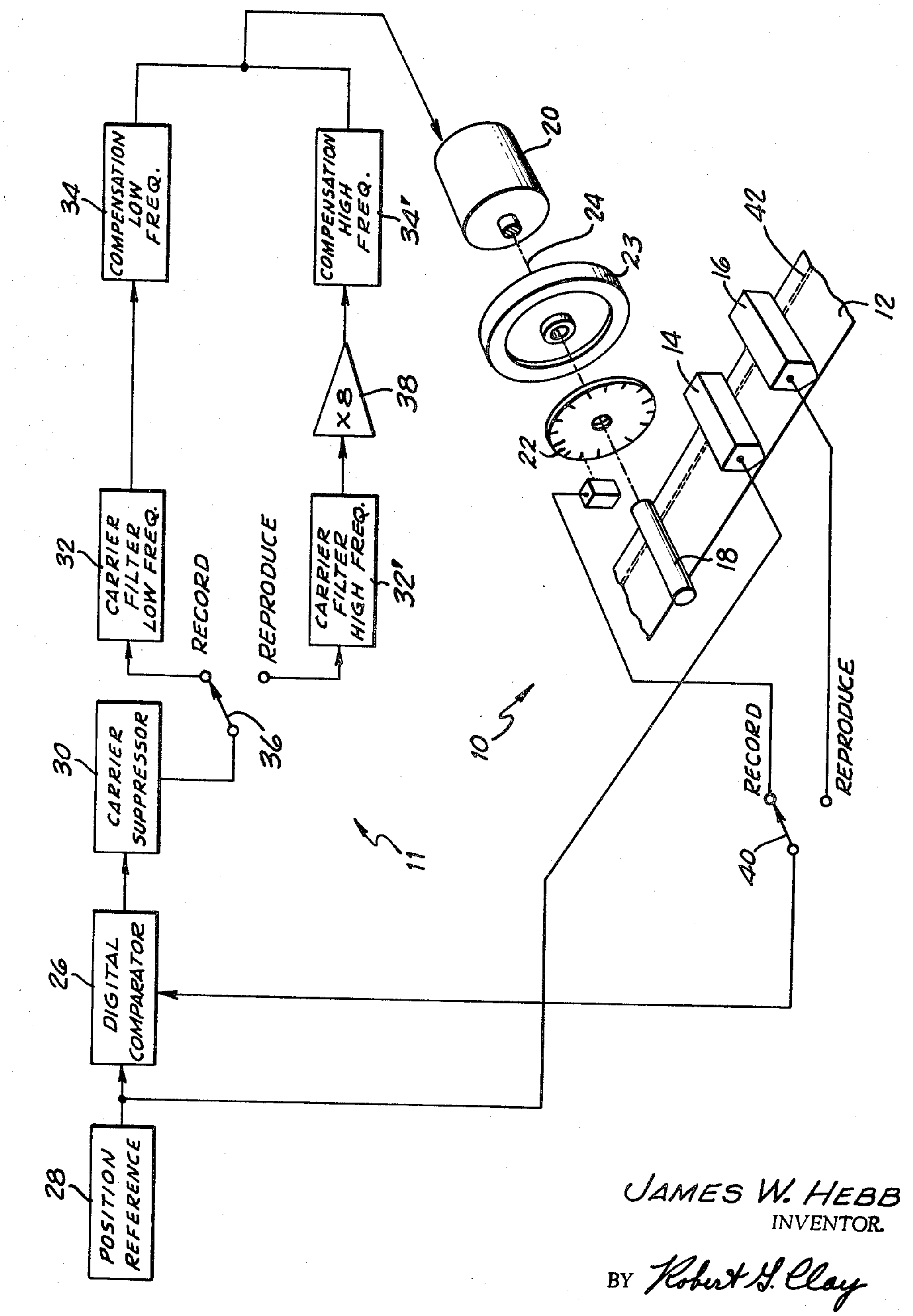
JAMES W. HEBB
INVENTOR.
BY Robert G. Clay
ATTORNEY United States Patent Office 3,395,326
Patented July 30, 1968

3,395,326
METHOD FOR IMPROVING THE VELOCITY ACCURACY OF A SERVO CONTROL SYSTEM

James W. Hebb, Mountain View, Calif., assignor to Ampex Corporation, Redwood City, Calif., a corporation of California Filed July 21, 1965, Ser. No. 473,758
6 Claims. (Cl. 318—312)

ABSTRACT OF THE DISCLOSURE

Tape speed control apparatus for enabling a recorded control signal to be precisely tracked during playback by increasing the sensitivity and thus the response of the playback circuitry. In one embodiment, a low gain servo loop is employed during the record process and a high gain servo loop is employed during the reproduce process. In another embodiment the control track recorded on tape has a relatively greater cycles per revolution as compared to the encoder disc to thus increase the sensitivity of the playback circuit. The increase in circuit sensitivity allows the apparatus to more precisely track any errors experienced by the tape during the record process.

In a high performance recorder/reproducer system, capstan servo control systems are utilized to maintain a precise relationship between the recording medium velocity and the record/reproduce magnetic head apparatus; i.e., to maintain a constant tape velocity. Such servo control systems generally employ a capstan tone wheel or "encoder disc" to provide pulses which are directly related to the angular velocity of the capstan, and which are in turn, compared with reference pulses of very accurate timing as obtained from a crystal oscillator, to produce an error signal for continuously controlling the capstan, and thus the velocity of the tape. Accordingly, it may be seen that the performance level of the recorder/reproducer system is dependent in part upon the accuracy with which the servo control system controls the capstan angular velocity.

However, the capstan angular velocity accuracy is itself limited by the accuracy with which the velocity can be detected. For example, although a precise reference track may be recorded on the tape from the crystal oscillator frequency source during the record process, inaccuracies may arise due to inherent limitations which are imposed by the encoder disc itself.

Accordingly, it is an object of the invention to provide an improved method for operating a capstan servo control system.

It is another object of the invention to reduce the velocity inaccuracies of a servo control system due to encoder disc errors, torque perturbations and capstan run-out or wobble.

It is another object of the invention to provide a capstan servo control system having an improved velocity accuracy of the final output signal of the tape exceeding an order of magnitude over that of the velocity transducer on the capstan.

It is another object of the invention to provide an improved servo control system for tape recorders utilizing a low frequency response system during the recording process, and a high frequency response system during the playback process.

Other objects and advantages may become apparent from the following description taken in conjunction with the accompanying drawing, in which the sole figure is a block diagram of an exemplary servo control system herein utilized to illustrate the concept of the invention.

Briefly, the invention resides in switching from a low gain servo loop during the recording process, to a high gain servo loop during the reproduce process. The high gain operation during playback enables a recorded control signal to be precisely tracked. This switch in gain results in tape position error improvement at least proportional to the ratio of $K_2/K_1$, where $K_2$ is the reproduce gain and $K_1$ is the record gain.

Referring to the figure, there is depicted a tape transport 10 associated with a servo control system 11, which provides motion for a recording medium or tape 12 in recording relation with record and reproduce heads 14 and 16, respectively. Motion of the tape 12 is provided by means of a capstan 18, driven in turn by direct coupling to a direct current (D.C.) motor 20. A tone wheel or encoder disc 22 and an inertia wheel 23 are likewise directly coupled to the capstan 18, wherein the motor 20, capstan 18, disc 22 and inertia wheel 23 in the present instance share a common shaft, such as schematically depicted by dashed line 24. The tape transport 10 and the capstan-encoder disc-motor combination may be any of the various systems which are well known in the art and accordingly, which do not require further explanation herein.

In the capstan servo control system 11 herein depicted in simplified block form to illustrate the invention, a digital comparator 26 is utilized to "compare" a signal of predetermined frequency received from an accurate frequency source or position reference 28, with a pulse signal, hereinafter termed a tachometer signal, received from the encoder disc 22. Any output signal, or error, between the compared signals results in an output error signal from the digital comparator 26. The error output signal is then applied to a power driver circuit (not shown) and the D.C. motor 20 via a suitable signal processing circuit, herein shown as a carrier suppressor circuit 30 and low frequency filter and compensation circuits 32 and 34, respectively. Similar filter and compensation circuits 32' and 34' for use at high frequencies are connected in parallel across the filter and compensation circuits 32 and 34, and a suitable switching means 36 having "record" and "reproduce" contacts is provided to allow selection of the desired portion of the circuit. An amplifier circuit 38, having for example a gain of eight, is connected between filter 32' and compensation circuit 34'. Accordingly, components 32', 34' and 38 provide one means whereby any error output signal from the digital comparator 26 is introduced to the motor 20 to compensate for the error-producing inaccuracies existing in the tape 12 velocity.

A switching means 40, having "record" and "reproduce" contacts, couples the encoder disc 22 to the digital comparator 26 via the "record" contact and the reproduce head 16 is connected to the "reproduce" contact of the switching means 40. The record head 14 is connected to the output of the position reference 28. It is to be understood that switching means 36 and 40 are shown schematically in somewhat simplified form to illustrate the invention.

It may be seen that the servo control system as briefly described allows tape velocity errors to be introduced from various sources, such as for example, capstan hub run-out or wobble, direct torque perturbations from either the tape 12 and/or the motor 20 and the inherent errors in the encoder disc 22. Because of velocity variations of tape 12, herein termed "flutter," from these sources of error, an accurate time base, i.e., a control track 42 of pulses from the position reference 28, preferably is recorded on the tape 12 during the recording process at the full frequency or at a derivative of the full frequency of the position reference 28. Thereafter, during the reproduce process the control track 42 is used in place of the encoder disc 22 (providing what is generally termed a "synchronize-off-tape mode") by placing switching means 40 in the reproduce position. Track 42 then acts as the source of the tachometer signal which is compared with the signal from the position reference 28.

In keeping with the invention concepts as further discussed hereinafter, during the reproduce process when the control track 42 of tape 12 is used as a tachometer signal source, the gain of the servo system is increased in any of the various manners as hereinafter described, thus insuring that all the errors that were recorded on the tape 12 during the record process are precisely followed. Concerning the broad concept of the invention, it may be said that the sensitivity of the servo system is increased is some manner during the reproduce process to insure an extremely accurate reproduction of the velocity variations of tape 12 as identified by the time base which was written on the control track 42 during the record process.

More particularly, in accordance with the invention, when a high performance tape control is required, i.e., when a low time base error is required, one of the normal data channels of tape 12 may be used for the control track 42. During the record process the servo system is operated at relatively low gain to record thus only those flutter components which are absolutely necessary due to other considerations. Thus, as illustrated in the figure, the servo control system 11 is operated in a low gain, $K_1$, position during the record process by placing switching means 36 and 40 in the "record" position. Simultaneously, the time base information from the position reference 28 is written on control track 42 of tape 12 via the record head 14, during the low gain operation of the servo system.

At such time as the tape information is to be read, i.e., during the reproduce process when the capstan control servo system is used in the synchrosize-off-tape mode, the control track 42 replaces the encoder disc 22 in the servo control system by placing switching means 40 in the "reproduce" position. Thus, the servo control system is, in essence, operated in a high gain, $K_2$, position during the reproduce process, at which time the time base information previously recorded on the control track 42 is introduced to the comparator 26 via the reproduce head 16. In one embodiment of the invention, the control track 42 has for example eight times the cycles per revolution as the encoder disc 22, and is preferably the means for achieving the relatively higher servo system gain and associated increased tape velocity accuracy in accordance with the invention concepts. Cycles per revolution may also be defined as samples per inch of tape, or as the terminology by which the frequency response of the circuit may be defined.

At tape speeds below 30 inches per second (i.p.s.) the data from the control track 42 is used directly, when the servo control system is operated in the synchronize-off-tape mode. If the speed of the tape 12 is 30 i.p.s. and above, the frequency of the data is divided down by a factor of eight. In another embodiment of the invention in order to obtain the desired high gain, the amplifier 38, which may be for example of a standard differential type and having a gain of eight, is switched along with the high frequency filter and compensation circuits 32' and 34' respectively, into the servo control system loop by means of switching means 36 in order to compensate for the frequency dividing and still retain a system gain increase of eight.

Although the invention has herein been described in conjunction with the particular servo control system 11 shown in the figure, it is to be understood that it is not limited to such use alone, but can be utilized in any servo control circuitry wherein an exacting reproduction of information on a moving magnetic medium is desired. Additionally, although the increase in gain is herein particularly accomplished by switching to the control track 42 for a tachometer signal source, or by adding an amplifier 38 of a gain of eight, the gain increase could be accomplished, for example, by decreasing the inertia of the inertia wheel 23. Thus, numerous variations may be made without departing from the spirit and scope of the invention as hereinafter claimed.

What is claimed is:

1. A method for improving the velocity accuracy of a capstan servo control system used to control the angular velocity of a tape recorder capstan during recording and reproducing processes comprising the steps of, operating said servo control system at a preselected sensitivity during the recording process to record only those flutter components absolutely necessary, recording an accurate time base on said tape during said recording process to provide a record of the flutter components experienced, and operating said servo control system during the reproducing process at a relatively higher sensitivity while utilizing said recorded time base on said tape to render the servo control system more responsive to the flutter components recorded in the accurate time base to allow the servo control system to more precisely follow the flutter components during the reproducing process.

2. A method for improving the velocity accuracy of a capstan servo control system used to control the angular velocity of a tape driving capstan during recording and reproducing processes comprising the steps of, comparing an accurate frequency source signal with a tachometer signal from an encoder disc coupled to said capstan during said recording process, introducing with a preselected circuit sensitivity any difference between said compared signals to a prime mover coupled to said encoder disc and said capstan to minimize the angular velocity variations of said capstan and thus record only those flutter components which are absolutely necessary during said recording process, recording said accurate frequency source signal on said tape in the form of a selected frequency relative to the frequency of the accurate frequency source signal during said recording process to provide a control track of selected frequency thereon, increasing the sensitivity of said servo control system to define a faster reacting system, and comparing said accurate frequency source signal with a tachometer signal obtained from said control track on said tape instead of from said encoder disc during said reproducing process to allow the servo control system of increased sensitivity to more precisely follow the errors in the capstan angular velocity which were recorded on the control track during said recording process.

3. The method in accordance with claim 2 wherein said accurate frequency source signal is recorded on said tape during said recording process to provide a control track thereon at the full frequency of the source signal.

4. In a capstan servo control system for controlling the angular velocity of a tape driving capstan during recording and reproducing processes and including an encoder disc rotatably coupled to said capstan, a prime mover coupled to said capstan and said encoder disc to rotate same, a comparator circuit, and an accurate frequency source signal circuit, a method for improving the velocity accuracy of the capstan comprising the steps of, operating said servo control system at a relatively low gain during the recording process while comparing signals from said accurate frequency source signal circuit with tachometer signals from said encoder disc in said comparator circuit, introducing any signal differences to said prime mover to compensate for variations in capstan angular velocity sensed by said encoder disc recording a time base signal from said accurate frequency source signal circuit on said tape in the form of a control track during said recording process, increasing the relatively low gain of said servo control system during the recording process to a relatively high gain during the reproducing process by adding a gain increasing element to the system during the reproducing process, and comparing the signals from said accurate frequency source signal circuit with a tachometer signal obtained from said previously recorded control track during said reproducing process to allow the relatively higher gain servo system to precisely follow all errors that were recorded on the tape during said recording process.

5. A method for improving the velocity accuracy of a capstan servo control system used to control the angular velocity of a tape driving capstan comprising the steps of, operating said servo system at a preselected value of gain while comparing an accurate frequency source signal with a tachometer signal obtained from an encoder disc rotatably coupled to said capstan during said recording process, introducing any signal differences between said compared signals to a prime mover rotatably coupled to said encoder disc and said capstan to minimize the angular velocity variations of said capstan during said recording process, recording said accurate frequency source signal on said tape during said recording process to provide a data control track thereon having eight times the frequency of said tachometer signal, comparing the data control track signal with said accurate frequency source signal during said reproducing process to provide a servo system gain having a value equal to eight times the value of gain of the servo system during the recording process.

6. The method according to claim 2 wherein the servo control system further includes an inertia wheel mechanically coupled to the tape driving capstan, wherein the step of increasing the sensitvity of the servo control system during the reproducing process comprises, decreasing the inertia of the inertia wheel a selected degree during the reproducing process.

References Cited

UNITED STATES PATENTS

| | | | |
|---|---|---|---|
| 2,864,988 | 12/1958 | Kline et al. | 318—163 X |
| 3,175,034 | 3/1965 | Kihara | 318—314 X |
| 3,179,870 | 4/1965 | Maxey | 318—318 X |

ORIS L. RADER, *Primary Examiner.*

J. J. BAKER, *Assistant Examiner.*